US 8,459,916 B2

(12) United States Patent
Widynowski et al.

(10) Patent No.: US 8,459,916 B2
(45) Date of Patent: Jun. 11, 2013

(54) BRACING SYSTEM AND METHOD FOR CARGO CONTAINERS

(75) Inventors: Garry Alexander Widynowski, Ottawa (CA); Bruce Alan Finley, Langley (CA)

(73) Assignee: Norseman Inc., Edmonton (CA)

( * ) Notice: Subject to any disclaimer, the term of this patent is extended or adjusted under 35 U.S.C. 154(b) by 222 days.

(21) Appl. No.: 12/609,701

(22) Filed: Oct. 30, 2009

(65) Prior Publication Data
US 2010/0111636 A1    May 6, 2010

Related U.S. Application Data

(60) Provisional application No. 61/111,137, filed on Nov. 4, 2008.

(51) Int. Cl.
*B60P 7/08* (2006.01)
(52) U.S. Cl.
USPC .......................... 410/152; 410/144; 410/150
(58) Field of Classification Search
USPC .............. 410/143, 144, 121, 150, 151, 155, 410/152; 248/200.1, 264, 214, 222.11, 224.7
See application file for complete search history.

(56) References Cited

U.S. PATENT DOCUMENTS

| | | |
|---|---|---|
| 2,124,082 A | 7/1938 | Riefer |
| 2,980,037 A | 4/1961 | Elsner |
| 3,145,834 A | 8/1964 | Hillger et al. |
| 3,799,070 A | 3/1974 | Munson |
| 4,026,508 A | 5/1977 | Ziegler |
| 4,079,677 A | 3/1978 | Vandergriff et al. |
| 4,700,918 A | 10/1987 | Andrasko |
| 4,784,287 A | 11/1988 | Yamada et al. |
| 4,932,817 A | 6/1990 | Mattare |
| 5,028,184 A | 7/1991 | Krause |
| 5,156,110 A | 10/1992 | Fuller |
| 5,219,251 A | 6/1993 | Kanczuzewski |
| 5,320,464 A | 6/1994 | Long et al. |
| 5,326,204 A | 7/1994 | Carlson et al. |
| 5,494,389 A | 2/1996 | Kanczuzewski |
| 6,086,299 A | 7/2000 | Kanczuzewski |

(Continued)

FOREIGN PATENT DOCUMENTS

| | | |
|---|---|---|
| CA | 2187039 | 8/1999 |
| GB | 1209255 | 10/1970 |
| GB | 2376013 B | 7/2003 |

OTHER PUBLICATIONS

Logipad Guide, Aug. 2007, 3 pp., Logistick, Inc., Indiana.

(Continued)

*Primary Examiner* — Stephen Gordon
(74) *Attorney, Agent, or Firm* — Lathrop & Gage LLP

(57) ABSTRACT

A bracing system and method are provided to restrain cargo against longitudinal movement within a cargo container. The system uses U-channels in opposing side walls of the cargo container adjacent a rear opening of the cargo container. The system includes one or more bracing bars and an end cap at the first end and at the second end of each bracing bar. Each end cap has a channel section providing an extension to fit in the U-channels of the cargo container. The channel section is configured for a frictional fit in the U-channel to resist vertical displacement in the U-channel once a bracing bar with a pair of end caps is forced into a horizontal position across the opening of the cargo container, with the channel sections in the opposing U-channels.

15 Claims, 4 Drawing Sheets

U.S. PATENT DOCUMENTS

| | | |
|---|---|---|
| 6,206,623 B1 | 3/2001 | Podd |
| D458,210 S | 6/2002 | Kanczuzewski et al. |
| D462,310 S | 9/2002 | Kanczuzewski et al. |
| 6,533,513 B2 | 3/2003 | Kanczuzewski et al. |
| D478,857 S | 8/2003 | Petersen et al. |
| 6,755,600 B2 | 6/2004 | Scott |
| 6,874,982 B2 | 4/2005 | Rhodes |
| 7,503,738 B1 * | 3/2009 | Doyle .................. 410/152 |
| 7,628,572 B2 | 12/2009 | Kanczuzewski et al. |
| 7,713,008 B2 | 5/2010 | Kanczuzewski et al. |
| 7,785,051 B2 | 8/2010 | Kanczuzewski et al. |
| 7,785,052 B2 | 8/2010 | Kanczuzewski et al. |
| 2002/0176759 A1 | 11/2002 | Kanczuzewski et al. |
| 2008/0152455 A1 | 6/2008 | Kanczuzewski et al. |
| 2008/0232921 A1 | 9/2008 | Kanczuzewski et al. |
| 2009/0074530 A1 | 3/2009 | Kanczuzewski et al. |
| 2009/0090827 A1 | 4/2009 | Kanczuzewski et al. |
| 2010/0172711 A1 | 7/2010 | Kanczuzewski et al. |

OTHER PUBLICATIONS

Wedge XL Guide, Feb. 2008, 2 pp., Logistick, Inc., Indiana.
Wedge International Guide, Feb. 2008, 2 pp., Logistick, Inc., Indiana.
Super Wedge Guide, (undated), 4 pp., Logistick, Inc., Indiana.
Floor Brace Guide, Aug. 2007, 2 pp., Logistick, Inc., Indiana.
International Search Report and Written Opinion for PCT/CA2009/001574, PCT application corresponding to present application, 9 pp.

* cited by examiner

BRACING SYSTEM AND METHOD FOR CARGO CONTAINERS

CROSS-REFERENCE TO RELATED APPLICATIONS

This application claims priority from U.S. Provisional Patent Application No. 61/111,137 filed Nov. 4, 2008, which is incorporated by reference herein to the extent that there is no inconsistency with the present disclosure

FIELD OF THE INVENTION

This invention relates to a system and method of bracing in a cargo container.

BACKGROUND OF INVENTION

Cargo or shipping containers, such as ISO containers, are commonly used to receive, store, and transport a wide variety of materials around the world by ship, truck and rail systems. When used to ship bulk cargo such as grains, bulkheads are installed at the cargo door(s) to constrain the cargo within the container. A plurality of horizontal bracing members, such as steel rods, are typically held within U-channels formed in opposing side walls at the container opening in order to brace the bulkhead against the bulk cargo. However, the steel bars are expensive and are subject to permanent deformation during bracing use.

SUMMARY OF THE INVENTION

The present invention provides a bracing system and a method of bracing in a cargo container. The invention also extends to end caps for use at the ends of bracing bars in such systems and bracing methods. The end caps may be integral with, or separate from the bracing bars. The end caps are configured with a channel section to form a tight frictional fit in opposing U-channels formed in the side walls of the container. The end caps have a bar section between the channel section and the ends of the bracing bar. The bar section is either integral with the ends of the bracing bar, or is configured to fit over the ends of the bracing bars to accommodate the end profile of a bracing bar. The end caps are further configured such that, when provided at the ends of the bracing bar and with the channel section in the U-channels of the cargo container, they hold the bracing bar horizontally across the container rear opening, with a tight frictional fit which resists vertical displacement in the U-channels. In a preferred embodiment, the end caps are shaped and configured to accommodate rectangular wood bracing bars, such as standard 2×4 inch lumber, and to hold the bracing bars within the U-channels such that the bracing bars are spaced horizontally across the cargo container opening with the shorter dimension of the rectangular wood bracing being cargo-facing. This preferred embodiment and "end-on" orientation of a 2×4 stud takes advantage of the increased strength provided by this shorter dimension of the bracing bar.

Broadly stated, the invention extends to a bracing system to restrain cargo against longitudinal movement within a cargo container of the type which forms aligned, inwardly opening U-channels in opposing side walls of the cargo container adjacent an opening at the rear of the cargo container. The bracing system includes one or more bracing bars, each having a first end, a second end, and a length to span the distance between the opposing side walls of the container when positioned horizontally between the side walls. The bracing system further includes an end cap at the first end and at the second end of each bracing bar. Each end cap has a channel section which provides an extension to fit in the U-channel of the cargo container. The channel section is configured for a frictional fit in the U-channel to resist vertical displacement in the U-channel once a bracing bar with a pair of end caps is forced into a horizontal position across the opening of the cargo container, with the channel sections in the opposing U-channels.

The invention also broadly extends to a method of bracing to restrain cargo against longitudinal movement within a cargo container of the type which forms aligned, inwardly opening U-channels in opposing side walls of the cargo container adjacent an opening at the rear of the cargo container. The method includes:

i. providing a bracing bar having a first end, a second end, and a length to span the opposing side walls of the cargo container when positioned horizontally between the side walls;

ii. providing an end cap at the first end and at the second end of the bracing bar, each end cap having a channel section which provides an extension to fit into opposing U-channels of the cargo container, the channel section being configured for a frictional fit in the U-channel to resist vertical displacement in the U-channel once the bracing bar with a pair of end caps is forced into a horizontal position across the opening of the cargo container, with the channel sections in the opposing U-channels;

iii. placing the channel section of the end cap located at the first end of the bracing bar into a U-channel at a position desired for a horizontal brace;

iv. placing the channel section of the end cap located at the second end of the bracing bar into the opposing U-channel at a position above or below the position of the first end; and v. sliding the channel section of the end cap at the second end along the U-channel such that the bracing bar is generally horizontal and the channel sections at the first and second ends form a frictional fit in the U-channels.

The invention also broadly extends to end caps as above-described for use with a cargo bracing system.

DETAILED DESCRIPTION OF THE INVENTION

Figure 1:
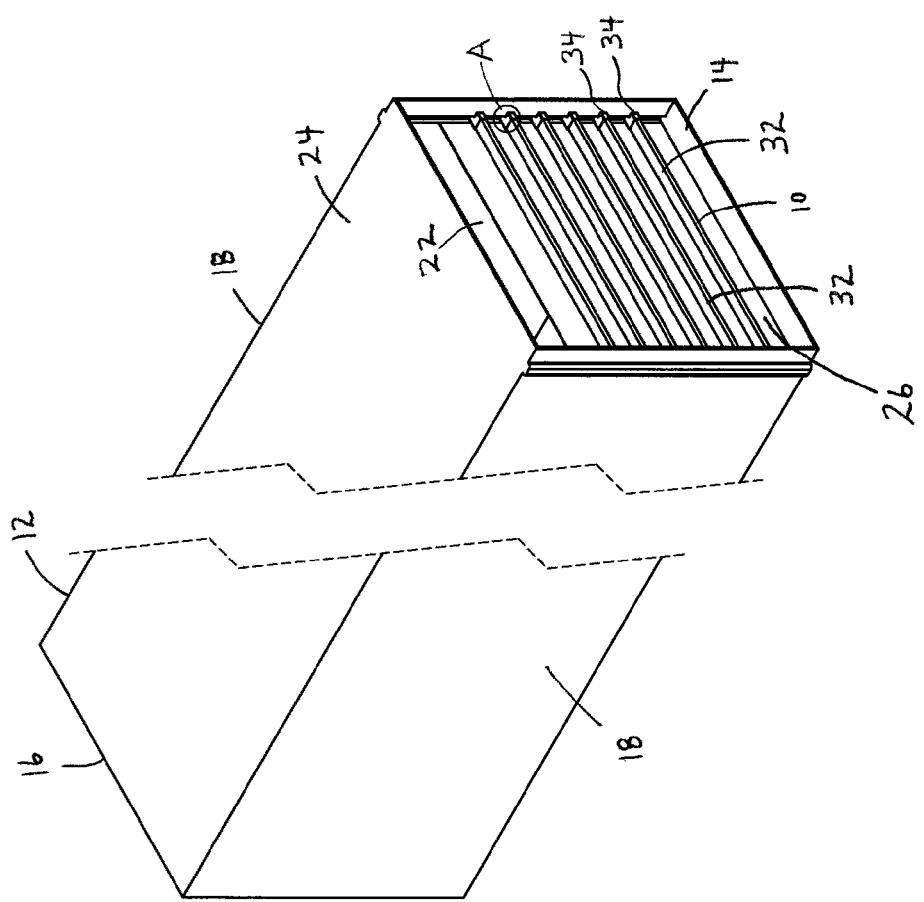
FIG. 1 is a perspective view showing the rear end of a cargo container with the bracing system of the present invention (cargo doors removed).

Having reference to FIG. 1, the end cap bracing system of this invention is shown generally at 10 within a typical industry standard ISO cargo container 12. The cargo container 12 is generally rectangular or square, with a horizontal floor 14, a vertical front wall 16 (typically fixed closed), opposed vertical side walls 18 and a rear opening 22. Cargo doors (not shown) are secured (typically hinged) at the rear of the container 12 for access to the container 12 during loading and unloading. The container 12 is shown with a roof 24 (optional for some applications). While the shipping container 12 shown in the figures is exemplary, it should be understood that the term "cargo container" as used herein and in the claims extends broadly to other types of containers such as might be used for truck, trailer, air, sea or rail shipping, provided aligned, opposing, inwardly opening U-shaped bracing channels (see below) are formed or provided in the side walls 18 to receive bracing members.

A bulkhead 26 is shown to be positioned vertically across the rear opening 22, at the rear of the cargo load (not shown). Bulkheads are well known in the art, and may be constructed for example as fabric, corrugated (cardboard paper or plastic), hexacomb, plywood and/or OSB (oriented strand board) bulkheads. Exemplary bulkheads are shown in U.S. Pat. No. 6,206,623 and Canadian Patent No. 2,187,039, both issued to Podd. Other known bulkhead systems or liners can be used with the bracing system 10 of this invention. The bracing system 10 can be used with or without a bulkhead or liner, depending on the type of cargo load. The bracing system 10 is shown to be positioned horizontally across the opening 22 adjacent the bulkhead 26 to brace the bulkhead 26 against bulk cargo (not shown) within the container 12, and thus to brace against longitudinal (front to rear) movement of the cargo.

Figure 2:
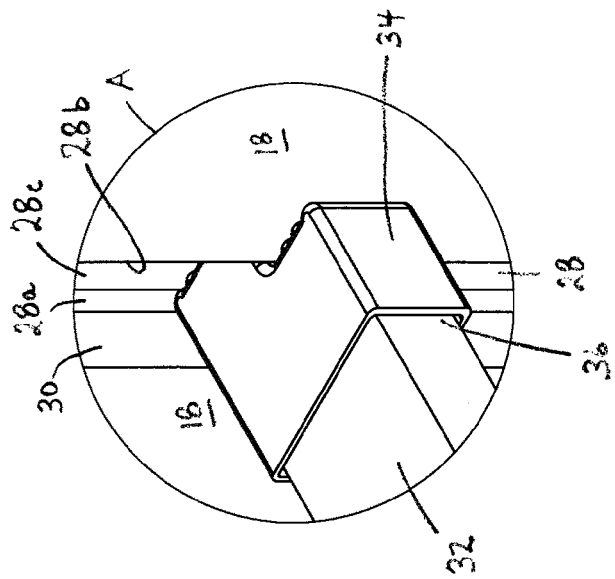
FIG. 2 is perspective view showing the detail of circle A from FIG. 1, illustrating the channel section of the end cap in a tight frictional fit within a U-channel in the container side wall.

In FIG. 1 and FIG. 2, the container 12 is shown to form bracing channels 28 which extend vertically between the roof 24 and floor 14 in the side walls 18 adjacent the opening 22. The bracing channels 28 are typically inwardly opening U-shaped channels (generally U-shaped in horizontal cross section) as shown, although other channel profiles might be present. The opposing U-channels 28 are aligned with each other such that a horizontal brace of sufficient length can be received in the channels 28 in a plane parallel to the plane of the opening 22. The U-channels 28 might be shaped somewhat differently from a strict "U" in cross section, for example they might be formed as a simple corrugation in the side walls 18, or C-shaped. Thus the term "U-channel" as used herein and in the claims is meant to extend to channels formed in the side walls 18 which are other than strictly U-shaped, but still function to accept and retain the ends of a horizontal brace. The U-channels 28 are more typically formed as an industry standard with a structural vertical corner members 30 positioned at the cargo-facing (inner) side of the U-channel 28 (see FIG. 2) for additional structural support. The corner members 30 are typically welded in place. The U-channel 28 is typically defined by inner and outer parallel channel side walls 28a, 28b (inner and outer facing respectively) spaced apart by channel web wall 28c (generally perpendicular to the channel side walls 28a, 28b). The bulkhead 26 is typically held adjacent the corner members 30 on the cargo-facing side of the corner members 30. The corner members 30 provide additional structural support for the bulkhead 26 and the bracing system 10.

The bracing system 10 includes a plurality of bracing bars 32 (six shown in FIG. 1) and a plurality of end caps 34 (twelve shown in FIG. 1). The end caps 34 are fitted onto the ends 36 of the bracing bars 32. Alternatively, the end caps might be formed integrally with the bracing bars (i.e., as a unitary item), although this is less preferred. As shown in the Figures, the bracing bars 32 are preferably formed from rectangular, square or round wood bars, most preferably rectangular with a short and long dimension (in cross section), such as 2"×4" lengths of lumber (i.e., 2×4 studs). Two by four studs (or alternate sizes) are relatively inexpensive compared to steel. The bracing bars 32 may be made of other materials (for example steel, plastic, reinforced plastic, or composite materials) which provide sufficient structural strength for bracing purposes. The bracing bars 32 may be formed with an end profile (i.e., cross sectional shape at their ends 36) other than the preferred rectangular profile of the Figures, for example square or round. The bracing bars 32 have first and second ends 36 and a length to span the distance between the opposing side walls 18 of the cargo container 12. While a solid unitary bracing bar with that length dimension is preferred for its strength, it will be understood that the bracing bar might be length adjustable, for example with telescoping sections which can be fixed to the desired length.

The end caps 34 are preferably formed of plastic resin materials such as polyethylene, nylon, polypropylene, polyurethane, polycarbonate, with polypropylene being most preferred. Alternatively, the end caps 34 may be formed from other structural materials such as steel, metal, or composite. The end caps 34 may be formed as molded, die cast or machined caps, depending on the material, with injection molding being most preferred for plastic resin materials.

Each end cap 34 is formed with a channel section 38 and a bar section 40. The sections 38, 40 are preferably formed integrally (i.e., as a unitary item) for overall simplicity and strength of the end cap, but might be formed as joined parts (ex. welded), depending on the material used in the end caps 34 and bracing bars 32. The channel section 38 has an exterior profile (i.e., cross sectional exterior shape) to mate with and adopt a tight frictional fit within the container channels 28. The bar section 40 has an interior profile to accommodate the end profile of the bracing bars 32 when the end cap 34 is fitted over the ends 36 of the bracing bars 32. In the Figures, the exterior profile of the channel section 38 is shown to be configured for a U-channel 28, and the interior profile of the bar section 40 is shown to be configured for a rectangular bar such as a 2×4 stud. The end cap 34 is hereafter described for these preferred profiles. However, as noted above, the channels 28 and bars 32 might have different profiles, in which case the end caps 34 are modified accordingly.

Figure 4:
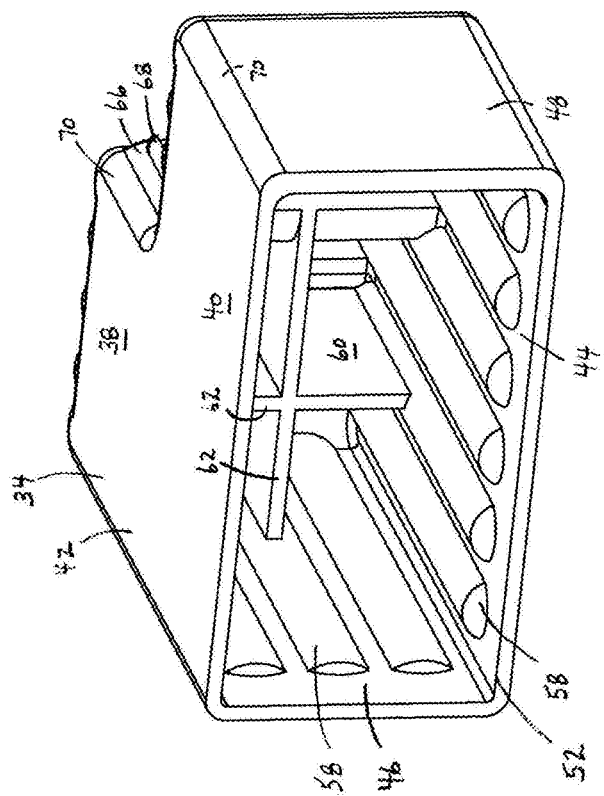
FIG. 4 is a perspective view of the end cap of FIG. 3, showing the interior of the end cap including inwardly protruding ribs and cross members for structural strength.
Figure 3:
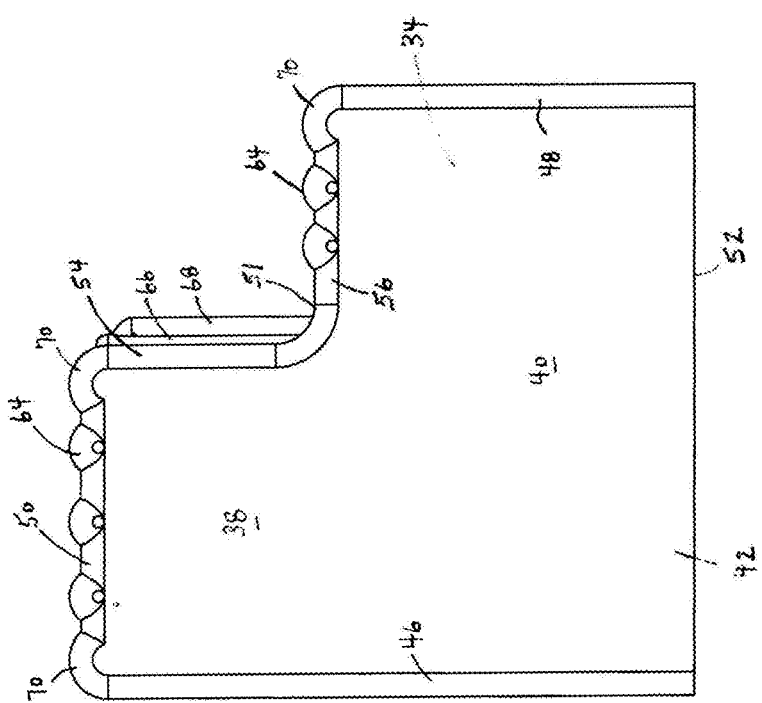
FIG. 3 is a top view of an end cap showing a preferred L-shaping of the integral channel section and bar section to accommodate U-channels of the container and 2×4 wood bracing bars respectively.

As best shown in FIG. 3 and FIG. 4, the end cap 34 is a generally hollow cap, formed with a top face 42 and a bottom parallel face 44. The faces 42, 44 are preferably generally L-shaped faces to accommodate rectangular bracing bars such as 2×4 studs, and to form U-shaped channel sections 38. The faces 42, 44 are spaced apart and connected by perpendicular side walls and end walls. In the preferred embodiment of the figures, there are shown long and short parallel side walls 46, 48 (perpendicular to faces 42, 44) and an end wall 50 (perpendicular to faces 42, 44 and to side walls 46, 48). Opposite the end wall 50 is bar opening 52, sized and shaped to accommodate the end profile of the bracing bar 32. When the channel section 38 of the end cap 34 is positioned in the U-channel 28 (see FIG. 2), the long side wall 46 is cargo-facing (inner facing), the short side wall is opening facing (outer facing), and the end wall 50 faces the web wall 28c of the U-channel 28. The end cap 34 is preferably formed with a step 51 between the end wall 50 and the short side wall 48, the step 51 being defined by a rise wall 54 parallel to the side walls 46, 48 and a step wall 56 parallel to the end wall 50 and the bar opening 52. When positioned in the U-channel 28, the rise wall 54 faces the outer wall 28b of the U-channel, and the step wall 56 faces the container side wall 18. The step wall 56 provides a right-angled step wall (or side arm) configured to extend rearwardly of the channel section 38 along the side wall 18 of the cargo container, to transfer longitudinal load from the cargo onto the side walls 18 of the cargo container 12.

As best seen in FIG. 4, a plurality of ribs 58, preferably inwardly protruding, are preferably formed on one or more of the interior of the faces 42, 44 and long and short side walls 46, 48 (preferably on all of 42, 44, 46 and 48). The ribs 58 stiffen and strengthen the end cap 34 and form a tight fit with the end 36 of the bracing bar 32. The ribs 58 allow the wall thicknesses of the faces 42, 44 and side walls 46, 48 to be reduced, while still providing sufficient structural strength to the end cap 34. Particularly when the bracing bar 32 is a 2×4 wood stud, the dimensions of the bracing bar ends 36 may be slightly off the industry standard 2×4. In that case, the ribs 58 also ensure a tight fit to the bracing bar 32. The ribs 58 are preferably recessed from the opening 52 for ease of fitting the end cap 34 on the bar ends 36 (a hammer or mallet might be used). The ribs 58 are preferably parallel spaced from each other, and extend perpendicularly to the plane of the bar opening 52. The ribs 58 are preferably formed of the same material as that of the end cap itself, preferably injection molded polypropylene. However, as mentioned above for the end cap materials, other materials may be used.

One or more interior structural supports 60 are preferably formed within the channel section 38 of the end cap 34 to stiffen and strength this section 38 to hold its shape for positioning in the U-channel with a frictional fit. In FIG. 4, the structural supports 60 are shown as cross members 62 between the faces 42, 44 and between the long side wall 46 and the rise wall 54. These cross members 62 may be formed by injection molding with the preferred polypropylene material of construction, or of other materials as mentioned previously for the end cap itself. Alternatively, the structural supports 60 might be formed by some other shape of cross members or by filling the channel section 38, although the latter is a more expensive option.

The end wall 50 and step wall 56 are also preferably formed with a plurality of ribs 64, preferably inwardly and outwardly protruding, to stiffen and strengthen the end wall 50 and step wall 56 in a manner similar to that described above for ribs 58.

Figure 5:
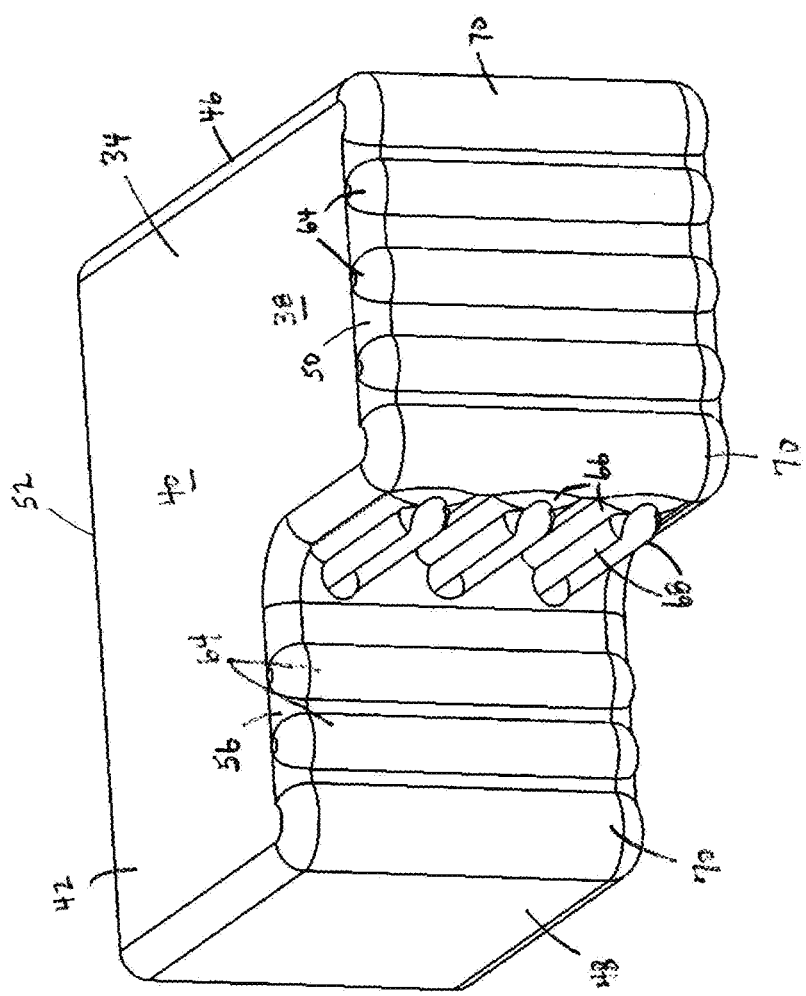
FIG. 5 is a perspective view of the end cap of FIG. 3 showing outwardly protruding ridges for structural strength and the outwardly protruding ridges for a tight frictional fit of the channel section with the U-channels of the container during bracing.
Figure 6:
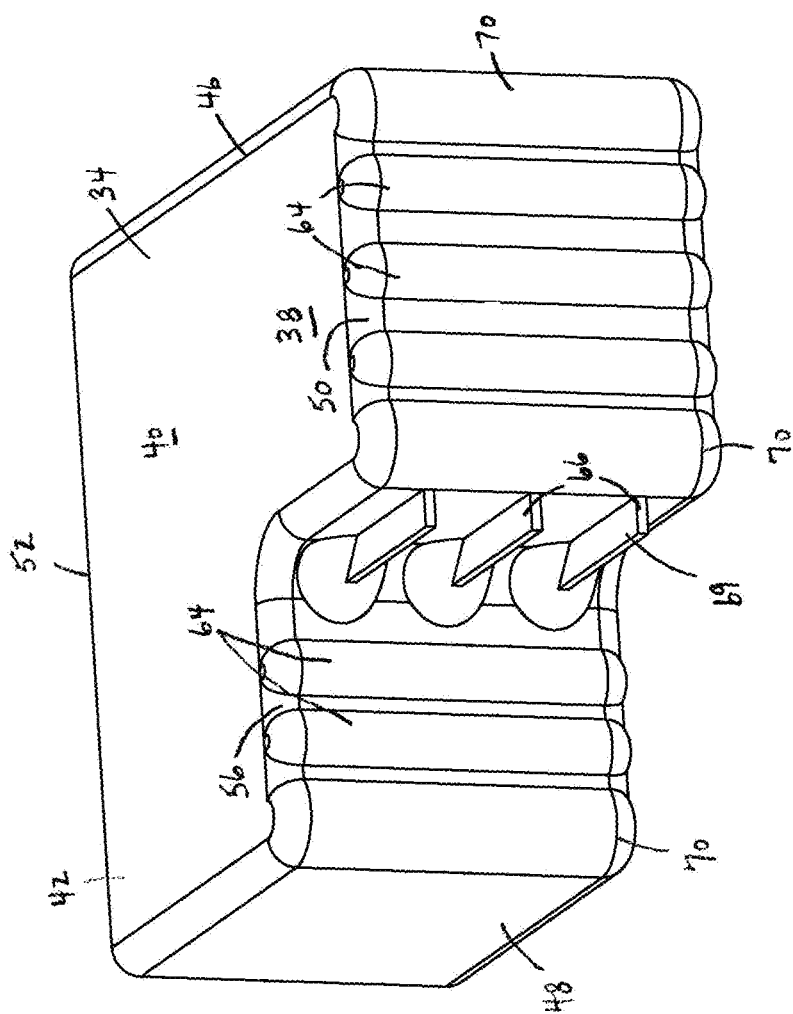
FIG. 6 is a perspective view of an alternate embodiment of an end cap showing outwardly protruding fins for a tight frictional fit in the U-channels, the fins being molded as parallel spaced fins oriented perpendicular to the rise wall of the channel section.

As best shown in FIGS. 5 and 6, the rise wall 54 of the channel section 38 is preferably configured so as to provide a frictional fit in the U-channel 28, once the bracing bar 32 fitted with end caps is forced into the horizontal position with the channel sections 38 in opposing U-channels 28. The frictional fit is such that the bracing bar 32 fitted with end caps 34 resists vertical displacement in the U-channels once forced into the horizontal bracing position. To provide this frictional fit in view of slightly different dimensions of the U-channel between cargo containers, the channel section rise wall 54 is preferably formed with one or more outwardly extending protrusions which can collapse and/or deform once the channel section 38 is forced into the U-channel 28 between the channel side walls 28a, 28b. FIG. 5 shows these protrusions in the embodiment of a plurality of outwardly protruding, deformable ridges 66. The ridges 66 are formed of a deformable material such as the plastic materials used for the end cap itself. The ridges 66 will thus partially deform and/or partially collapse as the bracing bar 32 is slid into place in the U-channel 28 (bracing method described more fully below), to achieve a tight frictional fit. In applications/situations where the U-channels 28 meet perfect industry specifications, these ridges 66 may not be needed, and the channel section sizing and stiffness may be sufficient for the frictional fit. However, in practice, the U-channels 28 are not exact in dimensions, or become worn/damaged as the cargo container 12 is repeatedly used. One convenient manner of forming these deformable ridges 66 is to mold parallel cylindrical ridges 66 along the rise wall 54 (preferably in a direction perpendicular to the plane of the opening 52), and then to drill away a portion of the ridges 66 leaving outwardly protruding curved fins 68 which can deform against the U-channel outer side wall 28b during positioning and bracing. Other manners of forming deformable ridges 66 will be apparent to those skilled in art, such as machining or molding. As shown in FIG. 6, the deformable ridges may be molded as a plurality of parallel spaced, rigid, deformable fins 69, which project normal to the plane of the rise wall 54. Still further exemplary embodiments of outwardly extending protrusions on the rise wall 54 include the provision of a coating of a collapsible material such as high density foam or a felt pad, or the provision of one or more knobs, stiff bristles, or dimples extending from the face of the rise wall 54. The protrusions are most preferably formed by injection molding from the plastic resin material used for the cap itself, both for structural strength and for ease and low cost of manufacture.

As shown in the Figures, the corners between the faces 42, 44, and walls 46, 48, 50, 54 and 56 are preferably formed with rounded radius corners 70. This is particularly advantageous for the channel section 38 as it eases sliding the channel section 38 into the U-channels 28 during bracing. The radius corners 70 also provide extra strength and stiffening to the end cap 34.

Exemplary and preferred dimensions in inches/mm for the end cap 34 shown in the Figures (for 2×4 wooden stud bracing bars) are as follows (outside wall dimensions):
  bar opening 51—outside dimensions 3.90 inches×2.00 inches (99.06×50.80 mm)
  long side wall 46—4.00 inches (101.60 mm)
  short side wall 48—2.50 inches (63.50 mm)
  end wall 50—2.25 inches (57.15 mm).

It will be understood that the invention is not limited to those dimensions, which can change according to such factors as materials, container and channel dimensions, economics, bracing bar materials and bracing bar end profiles. The above dimensions are exemplary for industry standard 2×4 inch bracing bars and U-channels having an average spacing between their channel side walls of 2.36 inch (59.94 mm). In practice, this U-channel spacing is found to vary between about 57.5 and 60.1 mm, so the deformable ridges 66 are sized to assist in making the frictional fit. It will also be noted that the dimension of the short side wall 48 of the end cap 34 might be made thicker (ex. 0.15 inches, 3.81 mm) than that for the long side wall 46 (ex. 0.10 inches, 2.54 mm), to better withstand the bracing load placed on short side wall 48 during use.

It will further be understood that the term "2×4" as used herein and in the claims to refer to bracing bars, is meant to include bracing bars which vary slightly from these dimensions, and in particular the term includes the industry standard 2×4 wooden stud whose finished dimensions are roughly 1.5 inches×3.5 inches (38.1 mm×88.9 mm).

An important preferred feature of this invention is that the end caps 34 are configured to hold the preferred 2×4 bracing bars 32 in the U-channels 28 oriented such that their shorter dimension (slightly less than 2") is on end, facing the cargo. This maximizes the strength of the 2×4 during bracing, since the end-on strength of the short dimension of a 2×4 is roughly 5.5 times stiffer (resistance to deflection) than it is on the long dimension of the 2×4. If oriented with the long dimension (slightly less than 4" for a 2×4 stud) taking the bracing load, 2×4 lumber can break under many cargo loads. Thus, in a preferred embodiment, the end caps 34 are each configured to accommodate the end profile of a single 2×4 stud and then engage the U-channels 28 such that the stud is oriented with its short dimension (in cross section) being cargo-facing.

The bracing system 10 of this invention may be easily connected to the bulkhead 26, if desired, for example using cable ties or straps (not shown) extending from the bulkhead 26 and around one or more of the bracing bars 32. The bulkhead 26 may or may not be attached to a fabric or film liner (not shown) that holds bulk cargo and takes the shape of the cargo container, as is known in the art.

The bracing system 10 of this invention is installed as follows in a preferred method of bracing:

1. Load cargo container 12 through the opening 22 as known in the art with/without a liner and install the bulkhead 26 (if needed) forwardly of the U-channels 28, as known in the art.

2. Place end caps 34 on the ends 36 of a plurality of bracing bars 32 (bracing bars have horizontal length to span the width of the cargo opening 22 between the side walls 18).

3. Starting at the lower part of the opening 22, slide the first bracing bar into the U-channels 28 on either side of the container 12 by:
   a) fixing the channel section 38 of a first end cap 34 into the U-channel 28 on one side of the container 12;
   b) angling the free end of the bracing bar 32 upwardly to place the free end cap 34 into the opposite U-channel 28, and
   c) sliding bracing bar 32 and end cap 34 downwardly in the U-channel 28 until the bracing bar 32 is substantially horizontal and the channel sections 38 of the end caps 34 make a tight frictional fit in the opposing U-channels 28. A mallet/hammer may be used to force the bracing bar 32 into the horizontal position, depending on the imperfections that may exist in the U-channels 28 from previous damage or wear and tear.

4. Repeat step 3, moving upwardly in the opening 22 with additional bracing bars 32 and end caps 34 as need to brace the cargo load.

5. Optionally connect the bulkhead to the bracing bars 32, for example with cable ties or straps or other connectors.

When the bracing system 10 of this invention is used with rectangular lumber such as 2×4 studs as the bracing bars 32, the end caps 34 are positioned in the U-channels to orient the 2×4 such that its short dimension is cargo facing to take advantage of the greater strength of the short dimension against the cargo load. In this preferred embodiment, the end caps 34 are as shown in the Figures, with the step 51 facing outwardly toward the opening 22. During bracing, the step wall 56 presses against the container side wall (see FIG. 2) and the channel section 38 of the end cap makes a tight frictional fit in the U-channel 28.

Some of the advantages available using the preferred embodiment of the bracing system 10 of the present invention include cost savings over steel bracing bars, ease of use without the need for fasteners between the end caps 34 and the bracing bars 32, and accommodating slightly off dimension, damage, wear and tear and imperfections in the bracing bars 32 and U-channels 28. The components of the bracing system (end caps 34 and bracing bars 32) are typically recycled or discarded after a single use, but depending on the materials of construction, the components might be reused. When the end caps 34 are formed from injection molded plastic resin, and the bracing bars 32 are single wooden 2×4 studs, the costs of bracing are significantly reduced, and the system can be discarded after a single use. The frictional fit of the channel sections 38 in the U-channels 28 avoids the need for additional spacers in the U-channels between parallel bracing bars 32, since the frictional fit resists vertical displacement in the U-channels once a bracing bar 32 fitted with end caps 34 is forced into the horizontal position.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practiced in the absence of any element or elements, limitation or limitations which is not specifically disclosed herein.

What is claimed is:

1. A bracing system to restrain cargo against longitudinal movement within a cargo container of the type having opposing side walls, an opening at the rear of the cargo container between the opposing side walls, and a U-channel formed in each opposing side wall adjacent the opening so as to form two opposing, aligned, inwardly opening U-channels, the bracing system comprising:
   one or more bracing bars, each bracing bar having a first end, a second end, and a length to span the opening when positioned horizontally between the side walls;
   an end cap at the first end and an end cap at the second end of each bracing bar, each end cap having a channel section which provides an extension to fit into one of the opposing U-channels of the cargo container, the channel section being configured for a frictional fit in the U-channel to resist vertical displacement in the U-channel once the bracing bar, the end cap at the first end and the end cap at the second end is forced across the opening of the cargo container, with the channel section of each end cap in one of the opposing U-channels; and each end cap having a bar section formed to accommodate the first end or the second end of each bracing bar, the bar section being formed with a right-angled step wall configured to extend rearwardly of the channel section along one of the opposing side walls of the cargo container to transfer longitudinal load from the cargo onto one of the opposing side walls of the cargo container.

2. The bracing system of claim 1, wherein the end cap is formed integrally with each bracing bar.

3. The bracing system of claim 1, wherein the end cap is formed separately from each bracing bar, and wherein the bar section of each end cap is formed with an opening to accommodate the first end or the second end of each bracing bar.

4. The bracing system of claim 3, wherein the channel section of each end cap has a rise wall which is rear-facing when positioned in one of the opposing U-channels, the rise wall being formed with one or more outwardly extending protrusions configured to be deformable or collapsible to provide the frictional fit in the U-channel.

5. The bracing system of claim 4, wherein the end cap is formed from a material selected from the group consisting of a plastic resin material, steel, metal and a composite material, and wherein each bracing bar is formed from a material selected from the group consisting of wood, steel, plastic, reinforced plastic, and a composite material.

6. The bracing system of claim 5, wherein the bar section and the channel section of the end cap are integral with each other.

7. The bracing system of claim 6, wherein the one or more outwardly extending protrusions are formed from a coating of a collapsible material on the rise wall or as one or more deformable ridges, knobs, stiff bristles or dimples extending outwardly from a face of the rise wall to provide the frictional fit in one of the opposing U-channels.

8. The bracing system of claim 6, wherein the one or more outwardly extending protrusions comprise one or more outwardly protruding deformable ridges formed on the rise wall to provide the frictional fit in one of the opposing U-channels.

9. The bracing system of claim 8, wherein each bracing bar comprises a 2×4 wooden stud, and wherein the opening of the bar section of the end cap has a profile to accommodate the first end or the second end of the 2×4 wooden stud and to hold the 2×4 wooden stud such that a shorter dimension of the 2×4 stud is cargo-facing when the end cap is in one of the opposing U-channels.

10. The bracing system of claim 9, wherein the end cap is formed by injection molding from a plastic resin material.

11. The bracing system of claim 10, wherein:
the end cap is generally hollow;
the end cap is formed with inwardly protruding ribs to strengthen the end cap; and
the end cap is formed with an internal structural support within the channel section.

12. The bracing system of claim 11, wherein the end cap is formed with outwardly protruding ribs on the step wall to strengthen the step wall.

13. The bracing system of claim 12, wherein the channel section forms a channel-facing end wall parallel to a plane through of the opening in the bar section, and wherein the end wall is formed with outwardly protruding ribs to strengthen the end wall.

14. The bracing system of claim 13, wherein the one or more outwardly protruding deformable ridges comprise a plurality of parallel spaced curved or rigid fins configured to be oriented perpendicular to a plane through the opening of the bar section, and which are injection molded from the plastic resin material.

15. The bracing system of claim 14, wherein the one or more outwardly protruding deformable ridges comprise a plurality of parallel spaced rigid fins configured to be oriented perpendicular to a plane through the opening of the bar section, and which are injection molded from the plastic resin material.

* * * * *